Patented June 23, 1925.

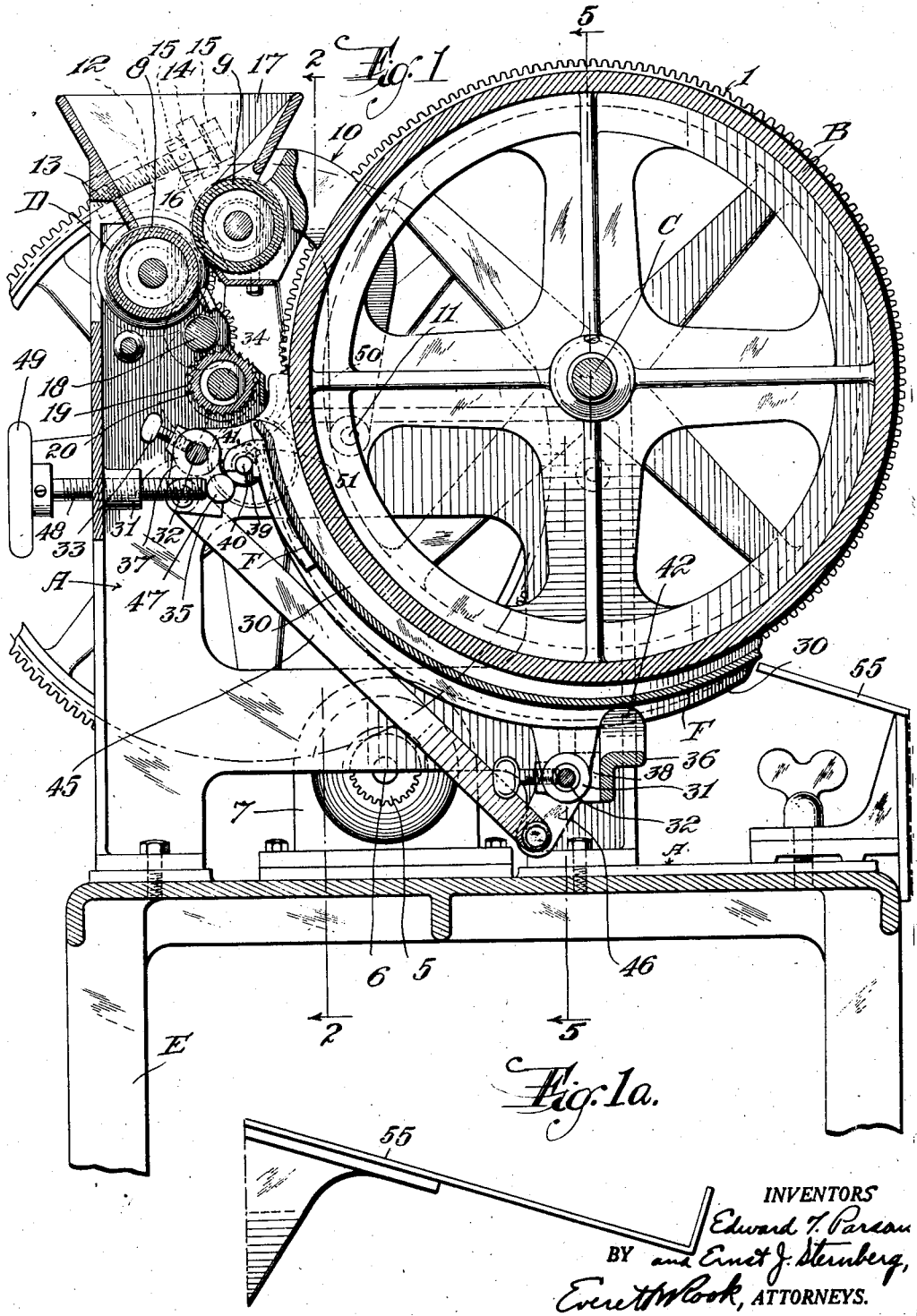

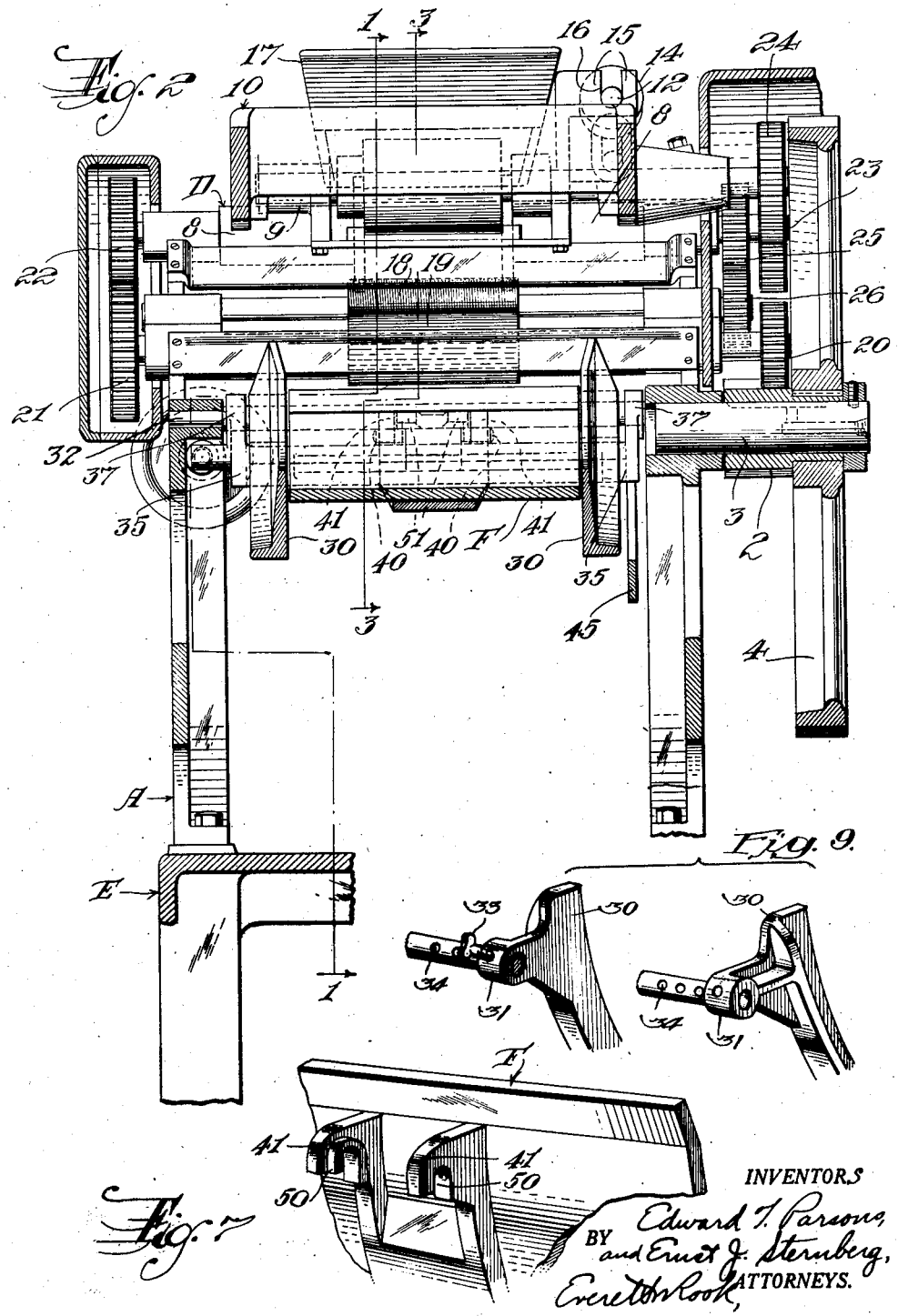

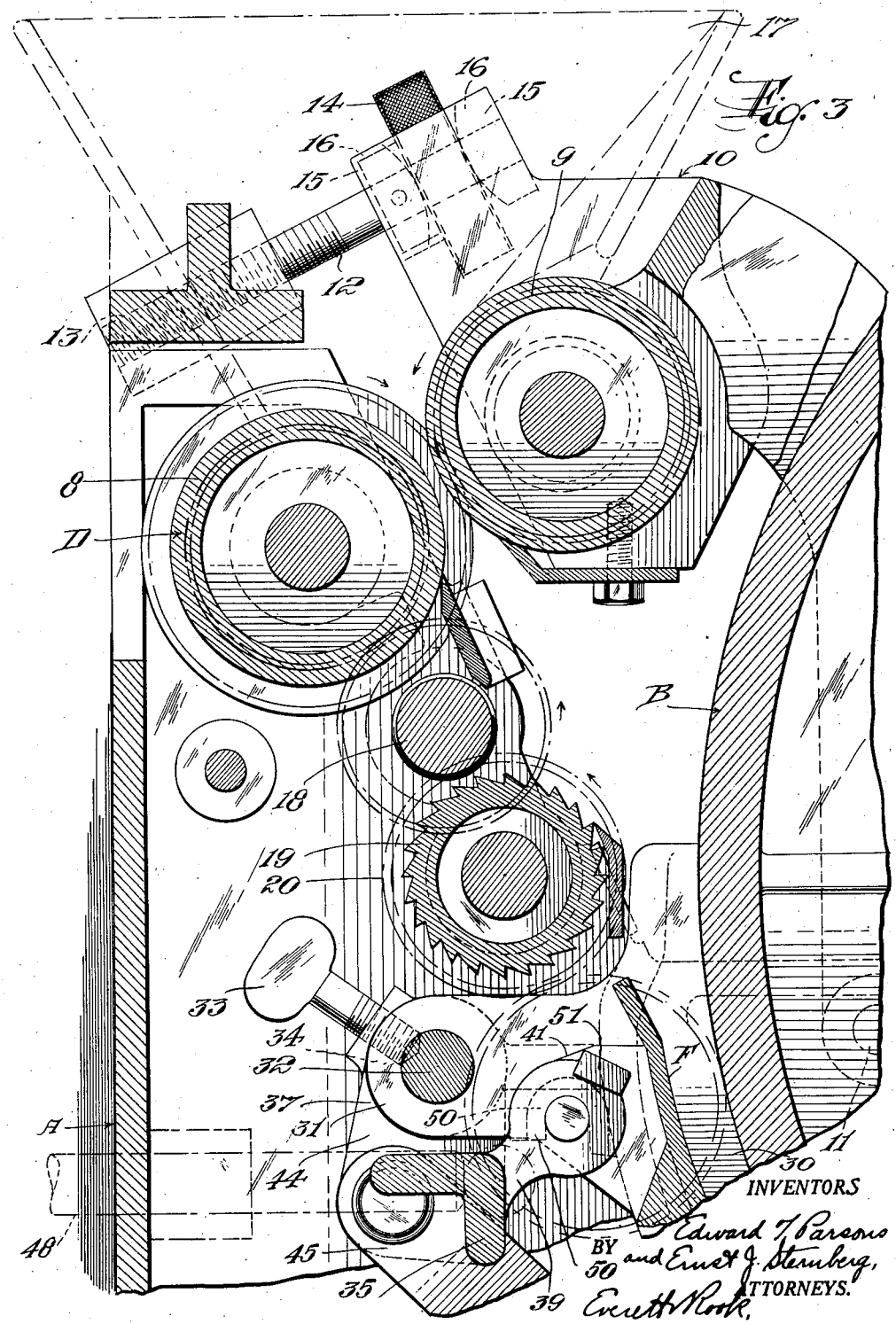

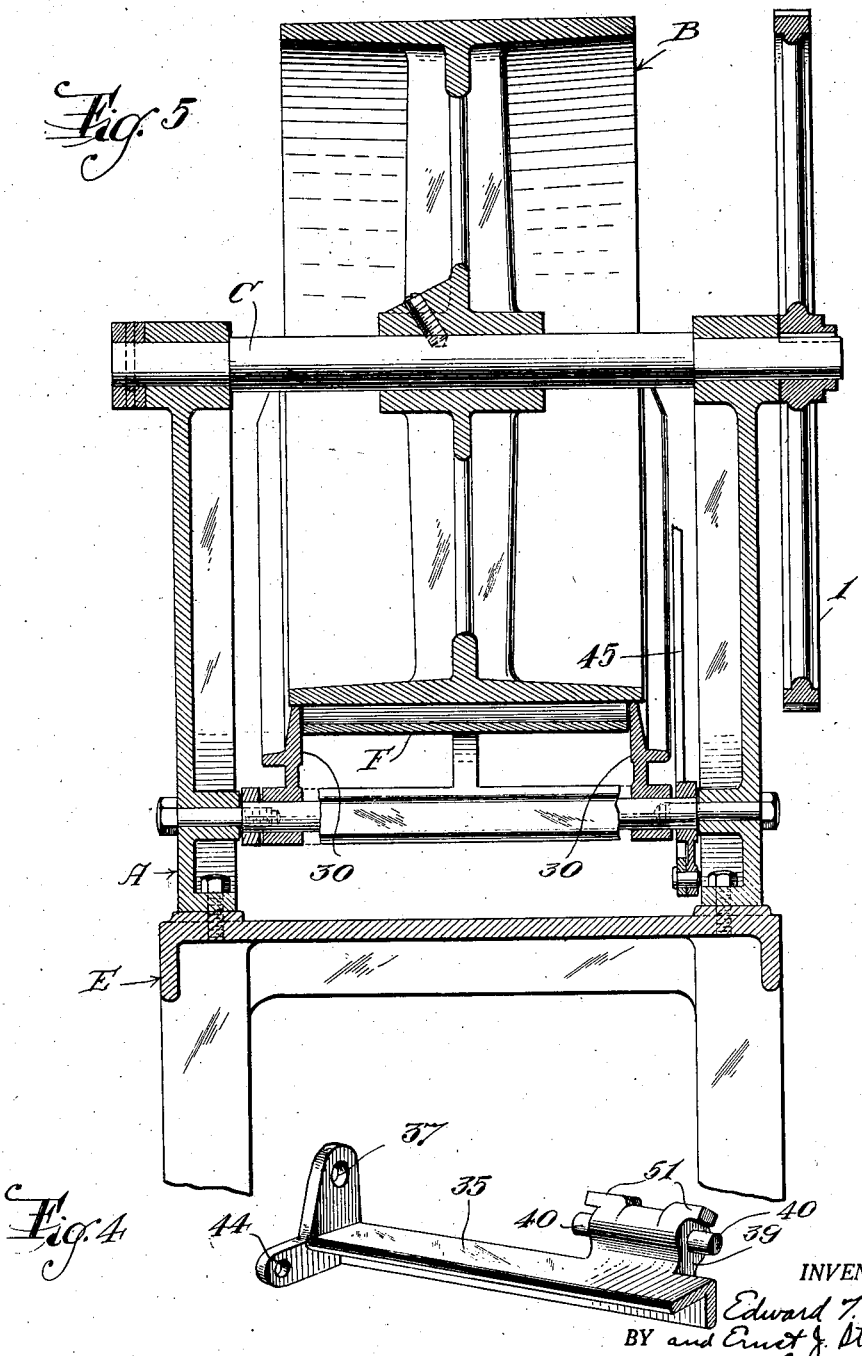

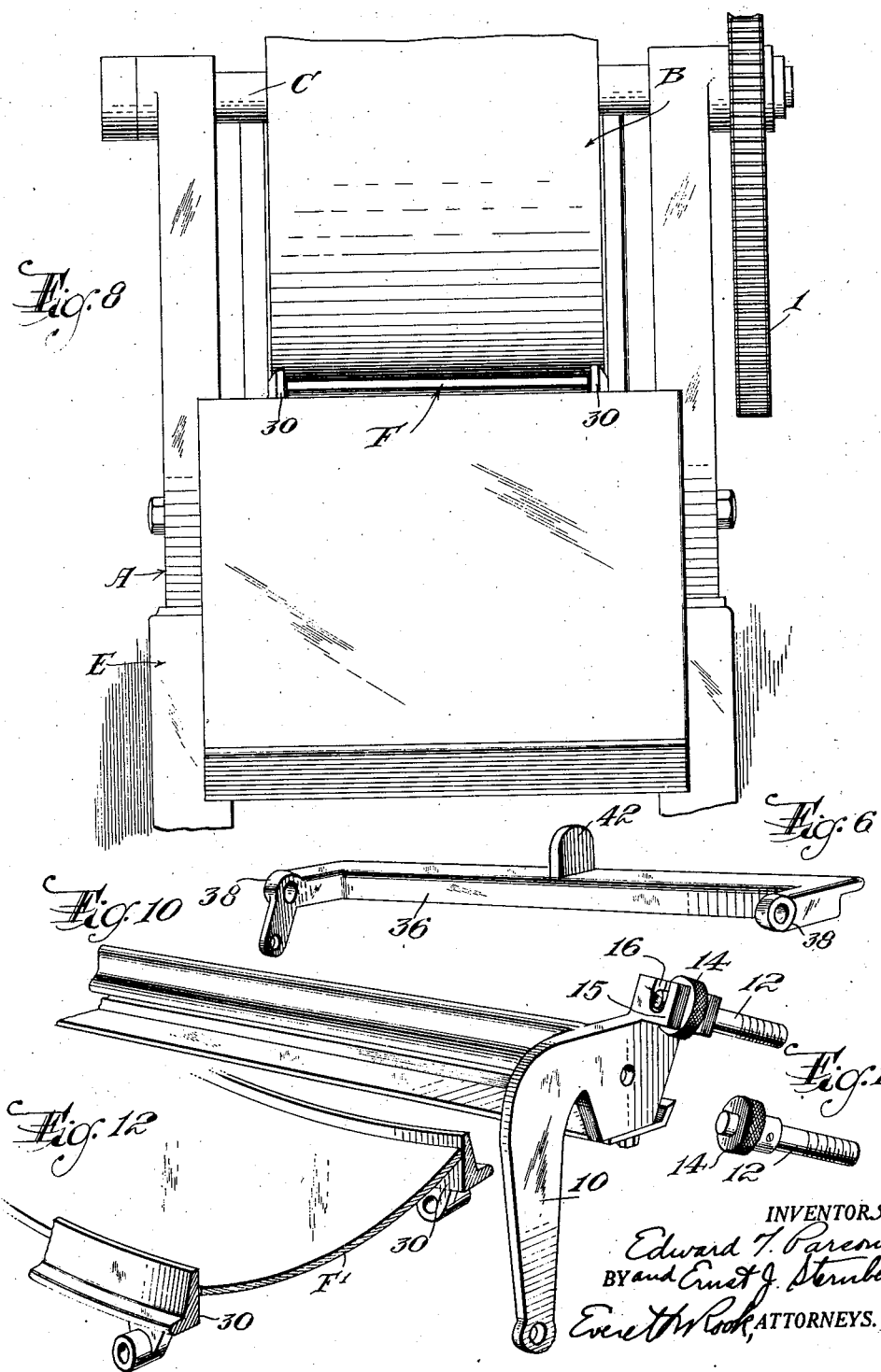

1,542,833

UNITED STATES PATENT OFFICE.

EDWARD T. PARSONS, OF NEWARK, AND ERNST J. STERNBERG, OF LYONS FARMS, NEW JERSEY, ASSIGNORS TO THOMSON MACHINE COMPANY, A CORPORATION OF NEW JERSEY.

ROLL-MOLDING MACHINE.

Application filed January 26, 1924. Serial No. 688,702.

*To all whom it may concern:*

Be it known that we, EDWARD T. PARSONS and ERNST J. STERNBERG, both citizens of the United States, and residents, respectively, of Newark, in the county of Essex and State of New Jersey, and Lyons Farms, in the county of Union and State of New Jersey, have invented new and useful Improvements in Roll-Molding Machines, of which the following is a specification.

This invention relates in general to a dough molding machine of the type described in United States Patent No. 701,646 to C. A. Thomson, June 3, 1902, in which a ball or lump of dough is first rolled between driven rollers into a thin sheet which is subsequently automatically spirally rolled to form a substantially cylindrical loaf, said loaf being then subjected to a rolling and squeezing pressure between a rotating drum and an arcuate compression plate to knead or work the dough into proper condition for the pan. More particularly the invention relates to a machine of this character especially designed for molding rolls as distinguished from loaves.

It is desirable that a roll molding machine be simpler in construction and less expensive than a loaf molder, but at the same time the roll molder must be capable of performing efficiently and thoroughly the work for which it is intended. Furthermore, the machine must be adapted with slight adjustment to mold rolls of different shapes, for instance straight rolls and rolls having pointed ends. This function is usually accomplished by compression plates of different shapes in cross-section. It is necessary for proper molding and kneading of the dough that the pressure thereon and the distance between the drum and compression plate be variable for different shapes and sizes of rolls. It is also necessary to proper molding that the space between the compression plate and the drum be adjustable for rolls of different lengths. Also, as it is essential to proper operation upon the dough that the sheet of dough produced by the "sheeting rollers" be of uniform thickness, an accurate and, for a roll molder, a simple and inexpensive means for adjusting the distance between the sheeting rollers is necessary.

The known roll molding machines are entirely lacking in or deficient in respect to mechanism for accomplishing the above-mentioned desirable results, and accordingly our invention has for its objects to provide a roll molding machine embodying novel and improved simple and inexpensive features of construction for obtaining all of the results and advantages above described.

More particularly the objects of the invention are to provide novel and improved means for mounting and adjusting the compression plate toward and from the molding drum to vary the space therebetween and the pressure on the dough; to provide a novel and improved construction for permitting quick and easy interchanging of different compression plates; to provide locking means for preventing accidental displacement of the compression plate; to provide adjustable flanges for the molding drum to accommodate rolls of different lengths, and to provide novel and improved means for mounting and adjusting the sheeting rollers.

In view of the fact that the adjustment of the flanges of the molding and kneading drum to accommodate rolls of different lengths is practically limited, another feature of the invention consists in providing a combination of the molding and kneading apparatus with a roll extending device, whereby the rolls after having been formed in the molder may be lengthened to the desired extent in the roll extending device. In many instances it is desirable also to provide a so-called panning conveyor for the purpose of conveying the rolls from the molding machine and facilitating the placing thereof in pans or removing them for other purposes. The invention therefore contemplates the combination of a panning conveyor and a loaf extender, the conveyor belt of the panning conveyor forming a part of the loaf extender, and the loaf extender being capable of being thrown out of operation without affecting the operation of the panning conveyor.

In the accompanying drawings, we have shown a preferred embodiment of the invention illustrating certain details of construction and arrangements of the parts, but it will be understood that this is mainly for the purpose of illustrating the principles of the invention and that many modifications and changes can be made in the construction of the machine without departing from the spirit or scope of the invention.

Referring to said drawings in which the same reference characters designate corresponding and like parts throughout the several views, Figure 1 is a vertical longitudinal sectional view through the loaf molding machine, taken on the line 1—1 of Figure 2;

Figure 1ª is a side elevation of a portion of the roll receiving tray for receiving the formed rolls from the machine, the other portion of which is illustrated in Figure 1;

Figure 2 is a transverse vertical sectional view, taken on the line 2—2 of Figure 1;

Figure 3 is an enlarged fragmentary vertical longitudinal sectional view, taken on the line 3—3 of Figure 2;

Figure 4 is a fragmentary detached perspective view of one of the compression plate supporting and adjusting members;

Figure 5 is a vertical transverse sectional view, taken on the line 5—5 of Figure 1;

Figure 6 is a detached perspective view of the lowermost one of the compression plate supporting and adjusting members illustrated in Figure 5;

Figure 7 is a fragmentary perspective view of the upper end of the compression plate;

Figure 8 is a fragmentary end elevation of the molding machine;

Figure 9 is a composite fragmentary perspective view of the upper ends of the adjustable flanges for the molding and kneading drum;

Figure 10 is a fragmentary perspective view of one end of the adjustable mounting for one of the sheeting rollers;

Figure 11 is a perspective view of the adjusting screw for said roller mounting;

Figure 12 is a fragmentary perspective view of a modified form of compression plate shown in combination with the flanges of the molding drum.

In the specific embodiment of the invention shown on the drawings, the reference character A designates the main frame of the machine on one end of which is journaled a kneading drum B on a transverse shaft C, one side of said drum being positioned adjacent a dough sheeting and roll forming mechanism D mounted at the end of the frame opposite the drum. The main frame A may be supported on a bench or on a table E in convenient position for operation.

The drum B may be driven in any suitable manner, but in the present instance the shaft C of the drum carries a gear 1 which meshes with a pinion 2 on a stub shaft 3 mounted on the frame A and carrying a gear 4 which meshes with a pinion 5 on the shaft 6 of an electric motor 7 which may be mounted on the bench or table in any suitable manner.

The drum B cooperates with an arcuate compression plate F which is spaced from the periphery of the drum and is adapted to receive between itself and the drum the roll which is formed by the dough sheeting and roll forming mechanism D.

The said dough sheeting and roll forming mechanism includes a pair of spaced parallel rollers 8 and 9 one of which is journaled in the frame A and the other of which, in the present instance the roller 9, is journaled in an adjustable frame 10 whereby said roller 9 may be moved toward and away from the roller 8 to vary the space therebetween. In the present instance the frame 10 is substantially U-shaped and has the extremities of its arms pivotally connected at 11 on horizontal axes to the frame A, whereby movement of the frame 10 about the pivots 11 moves the roller 9 toward and from the roller 8. For adjusting the frame 10, we may utilize a screw 12 threaded in the frame A, as at 13, and carrying a thumb nut 14 arranged between two spaced lugs 15 at one end of the frame 10, said lugs being provided with slots 16 to receive the screw 12. Obviously, rotation of the thumb nut 14 and screw 12 will swing the frame 10 toward and from the roller 8, the extent of rotation of the screw determining the distance between the rollers 8 and 9. A hopper 17 is mounted on the frame A above the rollers 8 and 9 to receive a lump or ball of dough and guide the same between said rollers. The rollers 8 and 9 are intergeared, and driven together so as to force the dough between them, as hereinafter described. The dough passing between the rollers is formed into a sheet and is then operated upon by a curling and roll forming mechanism which spirally rolls the sheet into substantially cylindrical form.

This roll forming mechanism includes a smooth roller 18 arranged beneath the sheeting rollers 8 and 9, and a fluted roller 19 arranged beneath the smooth roller 18 and adjacent the drum B. The shaft of the fluted roller 19 carries at one end a pinion 20 meshing with the pinion 2 mounted on the stub shaft 3. The other end of the fluted roller shaft carries a pinion 21 meshing with a pinion 22 on the shaft of the roller 8, and the other end of the shaft of the roller 8 carries a pinion 23 meshing with a pinion 24 on the shaft of the roller 9. It will be understood that the two pinions 23 and 24 will have teeth so formed as to permit of the adjustment of the roller 9 toward and from the roller 8. The shaft of the roller 8 also carries a pinion 25 meshing with a pinion 26 on the smooth roller 18.

With this construction, it will be observed that the respective rollers 18, 19, 8 and 9 will be driven in the direction indicated by the arrows on Figure 3 so as to move the sheet of dough between the rollers 8 and 9 and curl the same on the rollers 19 and 18. The roll thus formed is deposited by action of gravity into the space between the drum B and the compression plate F.

The compression plate is of a cross-sectional shape corresponding to the shape of the roll to be produced, for instance for a straight roll the surface of the compression plate next to the drum would be substantially parallel thereto, while for a roll having pointed ends the surface of the compression plate next to the drum would be concave, as shown in Figure 12. For limiting the length of the rolls and adjusting the machine to form rolls of different lengths, adjustable flanges 30 are provided for the drum at opposite sides of the compression plate. The compression plate being arcuate, the flanges 30 are also arcuate and of substantially the same length as the compression plate. The flanges will be of a thickness somewhat greater than the maximum thickness of the rolls to be produced. These flanges may be formed of cast metal and have one surface thereof concentric with the drum B. The ends of the flanges are provided with radially projecting lugs 31 having transverse openings to slidably fit rods 32 mounted in the frame A and extending transversely thereof, said rods and lugs being so relatively positioned that the flanges are slightly spaced from the periphery of the drum B so that there is no frictional contact between the drum and the flanges. For adjusting the flanges to vary the lengths of the rolls, the flanges are slid longitudinally of the rods 32 toward or from each other to the desired position, and preferably set screws 33 are provided in the lugs 31 for engaging recesses 34 in the corresponding rod 32 for holding the flanges in adjusted position. The recesses 34 are preferably equidistantly spaced to serve as indications in positioning the flanges. In adjusting the flanges transversely of the drum they are preferably slightly spaced from the edges of the compression plate F, so as to permit free movement of the plate toward and from the periphery of the drum.

Another important feature of the invention is the means for adjusting the compression plate toward and from the drum to accommodate different sizes of rolls and to vary the pressure thereon. This means is shown as comprising two substantially U-shaped bars 35 and 36, the arms of which are provided with the respective bearing lugs 37 and 38 pivotally mounted on the respective rods 32, whereby said bars may oscillate on said rods as pivots. The uppermost one of said bars, in the present instance the bar 35, is provided substantially centrally of its length with a laterally projecting arm 39 which carries studs 40 projecting from opposite sides thereof and substantially parallel to the bar. The upper end of the compression plate is provided with two downwardly facing hooks 41 spaced transversely of the compression plate and adapted to engage the studs 40 on the arm 39 to support said upper end of the compression plate. The lower end of the compression plate is supported by an upwardly extending lug 42 arranged substantially centrally of the length of the lowermost bar 36, the end of the lug being rounded to permit of a rocking action relative to the compression plate. The uppermost bar 35 is also provided at one end with a projection 44 which is connected by a link 45 to an arm 46 extending downwardly and rearwardly from one end of the lowermost bar 36. With this construction, it will be obvious that oscillation of the bars 35 and 36 about the rods 32 will cause the compression plate to be moved toward and from the periphery of the drum, and the link 45 ensures simultaneous movement of the two bars 35 and 36. For the purpose of rocking the bars 35 and 36, we may provide the uppermost bar 35 with a stud 47 projecting longitudinally from one end of the bar eccentrically to the shaft 32 and engaged by one end of a screw 48 threaded in the frame A and carrying a hand wheel 49. Action of gravity on the compression plate will tend to rock the bars 35 and 36 to permit the compression plate to move away from the drum when the screw 48 is moved outwardly, while when the screw 48 is moved inwardly against the stud 47 the compression plate will be forced toward the periphery of the drum.

With this construction, it will be observed that the compression plate F can be easily and quickly removed by merely unhooking the hooks 41 from the studs 40 and sliding the plate F longitudinally outward beneath the fluted roll 19, and this function of the machine permits easy and quick interchanging of compression plates for different shapes of rolls.

To lock the compression plate against accidental removal, we may provid the adjacent faces of the hooks 41 with lateral projections 50 which, when the compression plate is in operative position, underlie lugs 51 projecting from the arm 39 above the studs 40, as clearly shown in Figures 1, 3, 4 and 7. To remove the compression plate, the screw 48 is moved outwardly to permit the bar 35 to swing downwardly until the lugs 51 are disposed substantially parallel with the direction of movement necessary to remove the compression plate from the machine, whereupon the projections 50 on the hooks 41 will freely slide outward from beneath the lugs 51 as the compression plate is pulled from beneath the drum. This position of the bar 35 and the arm 39 is never assumed during operation of the machine, and therefore the compression plate is held against removal at all times while the machine is being used for forming rolls.

After the roll has been molded and kneaded between the compression plate F and the drum D, it is discharged from the space between the compression plate and the drum at the lower end of the compression plate, and a tray 55 may be mounted on the table E to receive the rolls as they are discharged.

A machine constructed in accordance with the invention is simple and comparatively inexpensive, and has been found to produce rolls more efficiently and of better quality than the known roll molding machines. While the particular construction described has been demonstrated to be practical and at present the preferred form, we do not desire to be understood as limiting ourselves except as required by the following claims when construed in the light of the prior art.

Having thus described the invention, what we claim is:

1. In a dough molding machine, the combination of a frame, a molding drum revolubly mounted thereon, an arcuate compression plate to surround a portion of said drum in spaced relation thereto to receive a roll of dough between itself and said drum, a pair of rocker bars extending transversely of said frame and separably engaging and supporting said compression plate at opposite ends thereof so that oscillation of said rocker bars moves said plate toward and from said drum, and cooperating means on one of said bars and said compression plate for locking said compression plate against disengagement from said rocker bars.

2. In a dough molding machine, the combination of a frame, a molding drum revolubly mounted thereon, an arcuate compression plate to surround a portion of said drum in spaced relation thereto to receive a roll of dough between itself and said drum, a pair of rocker bars extending transversely of said frame and separably engaging and supporting said compression plate at opposite ends thereof so that oscillation of said rocker bars moves said plate toward and from said drum, one of said bars and one end of said compression plate having a cooperating hook and stud for separably connecting said compression plate to said one of said rocker bars.

3. In a dough molding machine, the combination of a frame, a molding drum revolubly mounted thereon, an arcuate compression plate to surround a portion of said drum in spaced relation thereto to receive a roll of dough between itself and said drum, a pair of rocker bars extending transversely of said frame and separably engaging and supporting said compression plate at opposite ends thereof so that oscillation of said rocker bars moves said plate toward and from said drum, one of said bars and one end of said compression plate having separably cooperating members one of which is a hook for separably connecting said compression plate to said one of said bars.

4. In a dough molding machine, the combination of a frame, a molding drum revolubly mounted thereon, an arcuate compression plate to surround a portion of said drum in spaced relation thereto to receive a roll of dough between itself and said drum, a pair of rocker bars extending transversely of said frame and separably engaging and supporting said compression plate at opposite ends thereof so that oscillation of said rocker bars moves said plate toward and from said drum, one of said bars and one end of said compression plate having a cooperating hook and stud for separably connecting said compression plate to said one of said rocker bars, and a lug on the stud carrying member adapted to normally overlie said hook to prevent disconnection of said hook and stud.

5. In a dough molding machine, the combination of a frame, a molding drum revolubly mounted thereon, an arcuate compression plate to surround a portion of said drum in spaced relation thereto to receive a roll of dough between itself and said drum, a pair of rocker bars extending transversely of said frame and separably engaging and supporting said compression plate at opposite ends thereof so that oscillation of said rocker bars moves said plate toward and from said drum, one of said bars and one end of said compression plate having a cooperating hook and stud for separably connecting said compression plate to said one of said rocker bars, and means for normally preventing disconnection of said hook and stud, said means being releasable upon movement of said compression plate away from said drum a distance greater than the normal distance during operation of the machine.

6. In a dough molding machine, the combination of a frame, a molding drum revolubly mounted thereon, an arcuate compression plate to surround a portion of said drum in spaced relation thereto to receive a roll of dough between itself and said drum, a pair of spaced rocker bars arranged transversely of said frame, one of said bars and one end of said compression plate having a stud and hook connection and the other of said bars having a lug to frictionally engage and support the other end of said compression plate, whereby said rocker bars support said compression plate and oscillation of said bars adjusts said plate relatively to the periphery of said drum.

7. In a dough molding machine, the combination of a frame, a molding drum revolubly mounted thereon, an arcuate compression plate to surround a portion of said drum in spaced relation thereto to receive a roll of dough between itself and said drum, a pair of spaced rocker bars arranged transversely of said frame, one of said bars and one end of said compression plate having separably cooperating members one of which is a hook for separably connecting said compression plate to said one of said bars, the other of said bars having a lug to frictionally engage and support the other end of said compression plate, whereby said rocker bars support said compression plate and oscillation of said bars adjusts said plate relatively to the periphery of said drum.

8. In a dough molding machine, the combination of a frame, a molding drum revolubly mounted thereon, an arcuate compression plate to surround a portion of said drum in spaced relation thereto to receive a roll of dough between itself and said drum, a pair of rocker bars extending transversely of said frame and separably engaging and supporting said compression plate at opposite ends thereof so that oscillation of said rocker bars moves said plate toward and from said drum, one of said bars and one end of said compression plate having separably cooperating members one of which is a hook for separably connecting said compression plate to said one of said bars, and means to normally prevent separation of said members and permit such separation upon movement of said compression plate away from said drum a distance greater than the normal distance during operation of the machine.

9. In a dough molding machine, the combination of a frame, a molding drum revolubly mounted thereon, an arcuate compression plate to surround a portion of said drum in spaced relation thereto to receive a roll of dough between itself and said drum, a pair of rocker bars extending transversely of said frame and separably engaging and supporting said compression plate at opposite ends thereof so that oscillation of said rocker bars moves said plate toward and from said drum, one of said bars and one end of said compression plate having separably cooperating members one of which is a hook for separably connecting said compression plate to said one of said bars, said members being formed to interlock and prevent their separation during normal operation of the machine but permitting such separation when the compression plate is at a distance greater than normal from the drum.

10. In a dough molding machine, the combination of a frame, a molding drum revolubly mounted thereon, an arcuate compression plate to surround a portion of said drum in spaced relation thereto to receive a roll of dough between itself and said drum, a pair of spaced rocker bars arranged transversely of said frame, one of said bars and one end of said compression plate having a stud and hook connection and the other of said bars having a lug to frictionally engage and support the other end of said compression plate, whereby said rocker bars support said compression plate and oscillation of said bars adjusts said plate relatively to the periphery of said drum, the one of said first-mentioned bar and said compression plate having the stud being also provided with a lug adapted to normally overlie said hook to prevent disengagement thereof from said stud, said lug being positioned relatively to said hook when the compression plate is at a distance greater than normal from the drum so as to permit said hook to be disconnected from said stud.

11. In a dough molding machine, the combination of a frame, a molding drum revolubly mounted thereon, an arcuate compression plate to surround a portion of said drum in spaced relation thereto to receive a roll of dough between itself and said drum, a pair of spaced rocker bars arranged transversely of said frame, one of said bars and one end of said compression plate having a pivotal connection and the other of said bars having a lug to frictionally engage and support the other end of said compression plate, whereby said rocker bars support said compression plate and oscillation of said bars adjusts said plate relatively to the periphery of said drum, one of said bars being provided with a projection, a screw threaded in said frame and engaging said projection to positively move said bar in one direction and limit movement thereof in the other direction, and a link connecting said rocker bars to produce simultaneous oscillation of both thereof.

12. In a dough molding machine, the combination of a frame, a molding drum revolubly mounted thereon, an arcuate compression plate to surround a portion of said drum in spaced relation thereto to receive a roll of dough between itself and said drum, a pair of spaced rocker bars arranged transversely of said frame, one of said bars and one end of said compression plate having a stud and hook connection and the other of said bars having a lug to frictionally engage and support the other end of said compression plate, whereby said rocker bars support said compression plate and oscillation of said bars adjusts said plate relatively to the periphery of said drum, one side of said hook being provided with a projection and the one of said first-mentioned bar and said compression plate having the stud being also provided with a lug adapted to normally overlie said projection on the hook to prevent disengagement thereof from said stud, said lug being so positioned relatively to said hook when the compression plate is at a distance greater than normal from the drum as to permit said hook to be disconnected from said stud.

13. In a dough molding machine, the combination of a frame, a molding drum revolubly mounted thereon, an arcuate compression plate to surround a portion of said drum in spaced relation thereto to receive a roll of dough between itself and said drum, a pair of spaced rocker bars arranged transversely of said frame, one of said bars having a laterally projecting arm provided with a stud arranged substantially parallel to the axis of movement of said bar, one end of said compression plate being provided with a hook to separably engage said stud and the other end of said compression plate being supported on the other of said bars, and means for simultaneously rocking both of said bars to move said compression plate relatively to the periphery of said drum.

14. In a dough molding machine, the combination with a dough molding mechanism including a main frame, of a dough sheeting mechanism including a pair of spaced parallel rollers one of which is revolubly mounted in said frame adjacent said molding mechanism, a supplemental frame pivotally mounted at one end on said main frame to swing toward and from said first-mentioned roller, said supplemental frame carrying the other of said rollers whereby movement of said frame adjusts said second-mentioned roller relatively to the first-mentioned roller, said supplemental frame having a pair of slots intersecting each other at right angles, and a screw threaded in said main frame arranged in one of said slots and having a thumb nut arranged in the other of said slots whereby rotation of said thumb nut and screw swings said supplemental frame toward and from said first-mentioned roller.

15. In a dough molding machine, the combination with a main frame, a kneading drum revolubly mounted thereon, and an arcuate compression plate in spaced relation to the periphery of said drum, of arcuate flange members concentric with said drum, and means for mounting said flange members on said frame independently of said drum at the edges of said compression plate for adjustment longitudinally of said drum.

16. In a dough molding machine, the combination with a main frame, a kneading drum revolubly mounted thereon, and an arcuate compression plate in spaced relation to the periphery of said drum, of arcuate flange members concentric with said drum, a pair of spaced shafts arranged transversely of said frame, and means for mounting the ends of said flange members on said shafts at the side edges of said compression plate for adjustment longitudinally of said drum.

17. In a dough molding machine, the combination with a main frame, a kneading drum revolubly mounted thereon, and an arcuate compression plate in spaced relation to the periphery of said drum, of a pair of spaced shafts arranged transversely of said frame parallel to said drum, and a pair of arcuate flange members concentric with said drum having their ends slidably mounted on said shafts for permitting adjustment of said flange members longitudinally of said drum.

18. In a dough molding machine, the combination with a main frame, a kneading drum revolubly mounted thereon, and an arcuate compression plate in spaced relation to the periphery of said drum, of a pair of spaced shafts arranged transversely of said frame parallel to said drum and having a plurality of recesses spaced longitudinally thereof, a pair of arcuate flange members concentric with said drum having their ends slidably mounted on said shafts for permitting adjustment of said flange members longitudinally of said drum, and set screws in said flange members to engage said recesses for holding said flange members in adjusted positions.

EDWARD T. PARSONS.
ERNST J. STERNBERG.